United States Patent
Wang et al.

(10) Patent No.: US 11,011,056 B2
(45) Date of Patent: May 18, 2021

(54) FRAGMENTATION-AWARE INTELLIGENT AUTONOMOUS INTERSECTION MANAGEMENT USING A SPACE-TIME RESOURCE MODEL

(71) Applicant: Fujitsu Limited, Kawasaki (JP)

(72) Inventors: Nannan Wang, Plano, TX (US); Xi Wang, Murphy, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 16/193,818

(22) Filed: Nov. 16, 2018

(65) Prior Publication Data

US 2019/0236948 A1     Aug. 1, 2019

Related U.S. Application Data

(60) Provisional application No. 62/623,326, filed on Jan. 29, 2018.

(51) Int. Cl.
| | |
|---|---|
| *G08G 1/0967* | (2006.01) |
| *G05D 1/02* | (2020.01) |
| *G05D 1/00* | (2006.01) |

(52) U.S. Cl.
CPC ..... *G08G 1/096708* (2013.01); *G05D 1/0088* (2013.01); *G05D 1/0214* (2013.01); *G05D 1/0276* (2013.01); *G05D 2201/0213* (2013.01)

(58) Field of Classification Search
CPC ........... G08G 1/096708; G05D 1/0088; G05D 1/0214; G05D 1/0276; G05D 2201/0213
See application file for complete search history.

(56) References Cited

U.S. PATENT DOCUMENTS

| | | | | |
|---|---|---|---|---|
| 2009/0024357 A1* | 1/2009 | Aso | ......... | G08G 1/161 702/181 |
| 2013/0304279 A1* | 11/2013 | Mudalige | ........... | G08G 1/164 701/2 |

(Continued)

FOREIGN PATENT DOCUMENTS

| | | | | |
|---|---|---|---|---|
| CN | 103177596 A | * | 6/2013 | |
| DE | 102013225057 A1 | * | 6/2015 | ......... B62D 15/0265 |

OTHER PUBLICATIONS

Machine Translation of CN-103177596-A (Year: 2013).*

(Continued)

*Primary Examiner* — Anne Marie Antonucci
*Assistant Examiner* — Sahar Motazedi
(74) *Attorney, Agent, or Firm* — Baker Botts L.L.P.

(57) ABSTRACT

An intersection management system (IMS) may receive one or more traversing requests from one or more Connected Autonomous Vehicles (CAVs). The IMS may determine a solution space for each of the one or more traversing requests in a space-time resource model of the intersection, find a CAV trajectory allocation in the space-time resource model for each of the one or more traversing requests. The IMS may send an approved reservation to each CAV corresponding to each of the one or more CAV trajectory allocations that have been found. Each of the one or more CAVs may, when an approved reservation corresponding to the CAV may have been received from the IMS, move through the intersection zone as specified in the approved reservation.

23 Claims, 14 Drawing Sheets

(56) References Cited

U.S. PATENT DOCUMENTS

| | | | | |
|---|---|---|---|---|
| 2018/0093709 A1* | 4/2018 | Oguro | ............... | B62D 6/002 |
| 2018/0275678 A1* | 9/2018 | Andert | ............... | G05D 1/0276 |
| 2018/0349809 A1* | 12/2018 | Herminghaus | ...... | G06Q 10/047 |
| 2019/0086219 A1* | 3/2019 | Hashisho | ............... | G01C 21/20 |

OTHER PUBLICATIONS

Machine Translation of DE102013225057A (Year: 2015).*

Morris, David. "Driverless cars will be part of a $7 Trillion market by 2050." Jun. 3, 2017, url:http://fortune.com/2017/06/03/autonomous-vehicles-market/; 2 pages. Jun. 3, 2017.

Dresner, Kurt, and Peter Stone. "A multiagent approach to autonomous intersection management." *Journal of artificial intelligence research* 31 (2008): 591-656; 63 pages.

Lin, Peiqun, et al. "Autonomous vehicle-intersection coordination method in a connected vehicle environment." *IEEE Intelligent Transportation Systems Magazine* 9.4 (2017): 37-47; 11 pages.

Market Specialist. "How IBM is silently becoming an autonomous vehicle leader." Apr. 21, 2017, url:https://seekingalpha.com/article/4064205-ibm-silently-becoming-autonomous-vehicle-leader; 14 pages.

Fujitsu Limited. "Fujitsu and VMware Expand their Strategic Collaboration to Offer IoT Solutions for the Automobile Industry." Mar. 30, 2017, url:http://www.fujitsu.com/global/about/resources/news/press-releases/2017/0330-01.html; 3 pages.

Wigglesworth, Valerie. "Traffic signals in Frisco will soon talk with cars as part of a new technology push." May 2017, url:https://www.dallasnews.com/news/frisco/2017/05/01/traffic-signals-frisco-will-soon-talk-cars-part-new-technology-push; 9 pages.

Reuters. "Uber Debuts Self-Driving Cars in Pittsburgh." Sep. 14, 2016, url:http://fortune.com/2016/09/14/uber-self-driving-cars-pittsburgh/; 3 pages.

Steinmetz, Katy. "Exclusive: Lyft Cofounder Lays Out His Vision of the Driverless Future." Sep. 18, 2016, url:http://time.com/4495768/lyft-cofounder-john-zimmer-self-driving-cars/; 3 pages.

Tsuruhara, Yoshiro. "A partnership between Toyota and Uber looking ahead for automatic driving." Jun. 7, 2016, url:https://business.nikkeibp.co.jp/atcl/report/15/264450/060400035/; 6 pages.

D. Fagella, "Self-driving car timeline for 11 top automakers," https://venturebeat.com/2017/06/04/self-driving-car-timeline-for-11-top-automakers, Jun. 2017; 13 pages.

A. J. Hawkins, "GM will make an autonomous car without steering wheel or pedals by 2019," https://www.theverge.com/2018/1/12/16880978/gm-autonomous-car-2019-detroit-auto-show-2018, Jan. 2018; 6 pages.

A. Aupperlee, "Waymo announces driver-free av testing in arizona," http://www.govtech.com/fs/transportation/Waymo-Announces-Driver-Free-AV-Testing-in-Arizona.html, Nov. 2017; 5 pages.

J. Shaw, "Intersection safety issue briefs: the national intersection safety problem," https://safety.fhwa.dot.gov/intersection/, Nov. 2009; 1 page.

D. Schrank, B. Eisele, and T. Lomax, "Tti's 2012 urban mobility report," Texas A&M Transportation Institute. The Texas A&M University System, Dec. 2012; 68 pages.

K. Dar, M. Bakhouya, J. Gaber, M. Wack, and P. Lorenz, "Wireless communication technologies for its applications," IEEE Communications Magazine, vol. 48, No. 5, pp. 156-162, May 2010; 7 pages.

I. H. Zohdy, R. K. Kamalanathsharma, and H. Rakha, "Intersection management for autonomous vehicles using iCACC," in Proceedings, IEEE International Conference on Intelligent Transportation Systems (ITSC), Anchorage, AK, Sep. 2012; 6 pages.

J. Lee and B. Park, "Development and evaluation of a cooperative vehicle intersection control algorithm under the connected vehicles environment," IEEE Transactions on Intelligent Transportation Systems, vol. 13, No. 1, pp. 81-90, Jan. 2012; 10 pages.

J. Wu, A. Abbas-Turki, and A. El Moudni, "Cooperative driving: an ant colony system for autonomous intersection management," Applied Intelligence, vol. 37, No. 2, pp. 207-222, Oct. 2012; 16 pages.

Q. Jin, G. Wu, K. Boriboonsomsin, and M. Barth, "Advanced intersection management for connected vehicles using a multi-agent systems approach," in Proceedings, IEEE Intelligent Vehicles Symposium (IV), Madrid, Spain, Jun. 2012; 6 pages.

Z. Fang, Q. Li, Q. Li, L. D. Han, and S.-L. Shaw, "A space-time efficiency model for optimizing intra-intersection vehicle-pedestrian evacuation movements," Transportation Research Part C: Emerging Technologies, vol. 31, pp. 112-130, Jun. 2013; 19 pages.

S. Martello, D. Pisinger, and D. Vigo, "The three-dimensional bin packing problem," Operations Research, vol. 48, No. 2, pp. 256-267, Apr. 2000; 24 pages.

H. A. Rakha, K. Ahn, K. Moran, B. Saerens, and E. Van den Bulck, "Virginia tech comprehensive power-based fuel consumption model: Model development and testing," Transportation Research Part D: Transport and Environment, vol. 16, No. 7, pp. 492-503, Oct. 2011; 20 pages.

* cited by examiner

TABLE I
SIMULATION PARAMETERS

| VEHICLE TYPE | MAX SPEED (km/hr) | MAX ACCELERATION (km/hr/s) | MAX DECELERATION (km/hr/s) |
|---|---|---|---|
| A | 50.0 | 15.0 | 30.0 |
| B | 55.0 | 17.5 | 32.0 |
| C | 60.0 | 20.0 | 34.0 |
| D | 65.0 | 22.5 | 36.0 |
| E | 70.0 | 25.0 | 38.0 |

FIG. 9

FRAGMENTATION-AWARE INTELLIGENT AUTONOMOUS INTERSECTION MANAGEMENT USING A SPACE-TIME RESOURCE MODEL

CROSS-REFERENCE TO RELATED APPLICATIONS

This application claims priority from U.S. Provisional Application No. 62/623,326 filed Jan. 29, 2018, entitled "FRAGMENTATION-AWARE INTELLIGENT AUTONOMOUS INTERSECTION MANAGEMENT USING A SPACE-TIME RESOURCE MODEL," which is incorporated herein by reference in its entirety for all purposes.

BACKGROUND

Field of the Disclosure

The present disclosure relates generally to continuous autonomous vehicles intersection management and, more particularly, fragmentation-aware intelligent autonomous intersection management using a space-time resource model.

Description of the Related Art

The automotive industry is currently undergoing a significant transformation from human-driven to semi or fully autonomous vehicles (AVs). Several leading automakers and information technology companies around the world have announced their plans of deploying fully AVs by 2025, while testing of driver-free AVs on public roads has started recently.

Meanwhile, intersection traffic management remains a challenging issue for intelligent transportation systems (ITS). In the US, intersection-related accidents account for 44.8% of all crashes and 21.5% of all traffic fatalities. Moreover, intersections tend to become traffic bottlenecks, which lead to longer travel time and wasteful fuel consumption. Traditional intersection management methods, such as traffic lights and stop signs, may not be able to take full advantage of AVs. For example, AVs are capable of more accurate and reliable steering and speed control, which allow them to traverse intersections at a tighter inter-vehicle gap, thus improving overall traffic flow. In addition, AVs are expected to incorporate Vehicle-to-Vehicle (V2V) and Vehicle-to-Infrastructure (V2I) communications technologies such as Dedicated Short Range Communication (DSRC) for enhanced safety and traffic management. AVs are also referred herein as Connected Autonomous Vehicles (CAVs).

SUMMARY

In one embodiment, an intersection management system (IMS) may include a memory, a processor, and a space-time resource allocation algorithm stored within the memory and executable by the processor. The space-time resource allocation algorithm may receive one or more traversing requests from one or more CAVs within a request zone of an intersection. Each of the one or more traversing requests may correspond to a respective CAV of the one or more CAVs. The space-time resource allocation algorithm may also determine a solution space comprising one or more CAV trajectories of each respective CAV for each of the one or more traversing requests in a space-time resource model of the intersection. Each of the one or more CAV trajectories of each respective CAV may be represented by a parallelepiped including a traversing time, a traversing speed, and a CAV size. The space-time resource allocation algorithm may further find a CAV trajectory allocation in the space-time resource model for each of the one or more traversing requests based on the solution space of each respective CAV and each solution space of each of the other respective CAVs. The space-time resource allocation algorithm may also, when one or more CAV trajectory allocations may have been found, send an approved reservation to each CAV corresponding to each of the one or more CAV trajectory allocations that have been found. Each of the one or more CAVs may, when an approved reservation corresponding to the CAV may have been received from the IMS, move through the intersection zone as specified in the approved reservation.

In any of the disclosed embodiments of the IMS, the space-time resource allocation algorithm may also, prior to the determination of the solution space for each of the one or more traversing requests, allocate a sliding time window for when a respective CAV may be allowed to enter the intersection zone for each of the one or more traversing requests. The sliding time window may include a time frame from an earliest entry time to the intersection zone to the sum of the earliest entry time and a time buffer. The earliest entry time may be calculated based on a current speed and a current position of the respective CAV and the time buffer may be calculated based on a traversing request failure count, the traversing request of the one or more traversing requests corresponding to the respective CAV. The determination of the solution space for each of the one or more traversing requests may be based on the sliding time window for the respective CAV and one or more different traversing speeds over one or more different entry times.

In any of the disclosed embodiments of the IMS, the space-time resource allocation algorithm may also, prior to the determination of the solution space for each of the one or more traversing requests, determine a processing sequence for the one or more traversing requests based on a traversing request failure count of each of the one or more traversing requests. The determination of the solution space for each of the one or more traversing requests may be processed based on the determined processing sequence for the one or more traversing requests.

In any of the disclosed embodiments of the IMS, the space-time resource allocation algorithm may also, when one or more CAV trajectory allocations failed, send a rejected traversing request to each CAV corresponding to each of the one or more CAV trajectory allocations that failed.

In any of the disclosed embodiments of the IMS, each of the one or more CAVs may, when a rejected traversing request corresponding to the CAV may have been received from the IMS, increment a request failure count associated with the CAV and send a traversing request to the IMS until one of an approved reservation is received corresponding to the traversing request and the CAV enters an adjustment zone of the intersection.

In any of the disclosed embodiments of the IMS, each of the one or more CAVs may, when the CAV may be in an adjustment zone of the intersection, adjust speed, arrival time, and entry point based on the approved reservation.

In any of the disclosed embodiments of the IMS, each of the one or more CAVs may, when the approved reservation corresponding to the CAV may have been received from the IMS, stop sending any additional traversing requests to the IMS.

In any of the disclosed embodiments of the IMS, each of the one or more CAVs may, when a connection request may have been received from the IMS, set a request failure count to zero, determine an earliest arrival time to the intersection zone, and send a traversing request to the IMS including the earliest arrival time to the intersection zone, a current vehicle speed, a position, an entry lane, a departure lane, the request failure count, and vehicle properties.

In any of the disclosed embodiments of the IMS, a traversing request may include an earliest arrival time to the intersection zone, a current vehicle speed, a position, an entry lane, a departure lane, a request failure count, and vehicle properties. The vehicle properties may include a vehicle identity number, a width, a length, a maximum speed, a maximum acceleration, and a maximum deceleration.

In any of the disclosed embodiments of the IMS, the approved reservation may include a reserved trajectory including an entry time that a CAV enters the intersection zone, a traversing time of the CAV through the intersection zone, and a traversing speed of the CAV inside the intersection zone.

In a second embodiment, a disclosed method may include receiving, by an intersection management system (IMS), one or more traversing requests from one or more CAVs within a request zone of an intersection. Each of the one more traversing requests may correspond to a respective CAV of the one or more CAVs. The method may also include determining, by the IMS, a solution space including one or more CAV trajectories of each respective CAV for each of the one or more traversing requests in a space-time resource model of the intersection. Each of the one or more CAV trajectories of each respective CAV may be represented by a parallelepiped including a traversing time, a traversing speed, and a CAV size. The method may further include finding, by the IMS, a CAV trajectory allocation in the space-time resource model for each of the one or more traversing requests based on the solution space of each respective CAV and each solution space of each of the other respective CAVs. The method may also include, when one or more CAV trajectory allocations may have been found, sending, by the IMS, an approved reservation to each CAV corresponding to each of the one or more CAV trajectory allocations that have been found. The method may further include, for each of the one or more CAVs, when an approved reservation corresponding to the CAV may be received from the IMS, move, by the CAV, through the intersection zone as specified in the approved reservation.

In any of the disclosed embodiments of the method, the method may also include, prior to the determination of the solution space for each of the one or more traversing requests, allocating a sliding time window for when a respective CAV may be allowed to enter the intersection zone for each of the one or more traversing requests. The sliding time window may include a time frame from an earliest entry time to the intersection zone to the sum of the earliest entry time and a time buffer. The earliest entry time may be calculated based on a current speed and a current position of the respective CAV and the time buffer may be calculated based on a traversing request failure count the traversing request of the one or more traversing requests corresponding to the respective CAV. The method may further include determining the solution space for each of the one or more traversing requests based on the sliding time window for the respective CAV and one or more different traversing speeds over one or more different entry times.

In any of the disclosed embodiments of the method, the method may also include, prior to the determination of the solution space for each of the one or more traversing requests, determining a processing sequence for the one or more traversing requests based on a traversing request failure count of each of the one or more traversing requests. The determination of the solution space for each of the one or more traversing requests may be processed based on the determined processing sequence for the one or more traversing requests.

In any of the disclosed embodiments of the method, the method may also include, when one or more CAV trajectory allocations may have failed, sending a rejected traversing request to each CAV corresponding to each of the one or more CAV trajectory allocations that failed.

In any of the disclosed embodiments of the method, the method may also include for each of the one or more CAVs, when a rejected traversing request corresponding to the CAV may be received from the IMS, incrementing, by the CAV, a request failure count associated with the CAV and sending, by the CAV, a traversing request to the IMS until one of an approved reservation may have been received corresponding to the traversing request and the CAV may have entered an adjustment zone of the intersection.

In any of the disclosed embodiments of the method, the method may also include for each of the one or more CAVs, when the CAV may be in an adjustment zone of the intersection, adjust, by the CAV, speed, arrival time, and entry point based on the approved reservation.

In any of the disclosed embodiments of the method, the method may also include for each of the one or more CAVs, when the approved reservation corresponding to the CAV may be received from the IMS, stop sending any additional traversing requests to the IMS.

In any of the disclosed embodiments of the method, the method may also include for each of the one or more CAVs, when a connection request may have been received from the IMS, setting, by the CAV, a request failure count to zero, determining, by the CAV an earliest arrival time to the intersection zone, and sending, by the CAV, a traversing request to the IMS that may include the earliest arrival time to the intersection zone, a current vehicle speed, a position, an entry lane, a departure lane, the request failure count, and vehicle properties.

In any of the disclosed embodiments of the method, a traversing request may include an earliest arrival time to the intersection zone, a current vehicle speed, a position, an entry lane, a departure lane, a request failure count, and vehicle properties. The vehicle properties may include a vehicle identity number, a width, a length, a maximum speed, a maximum acceleration, and a maximum deceleration.

In any of the disclosed embodiments of the method, the approved reservation may include a reserved trajectory including an entry time that a CAV enters the intersection zone, a traversing time of the CAV through the intersection zone, and a traversing speed of the CAV inside the intersection zone.

BRIEF DESCRIPTION OF THE DRAWINGS

For a more complete understanding of the present invention and its features and advantages, reference is now made to the following description, taken in conjunction with the accompanying drawings, in which:

FIG. 9 is table of simulation parameters for simulating a space-time resource allocation algorithm;

DESCRIPTION OF PARTICULAR EMBODIMENT(S)

Figure 1:
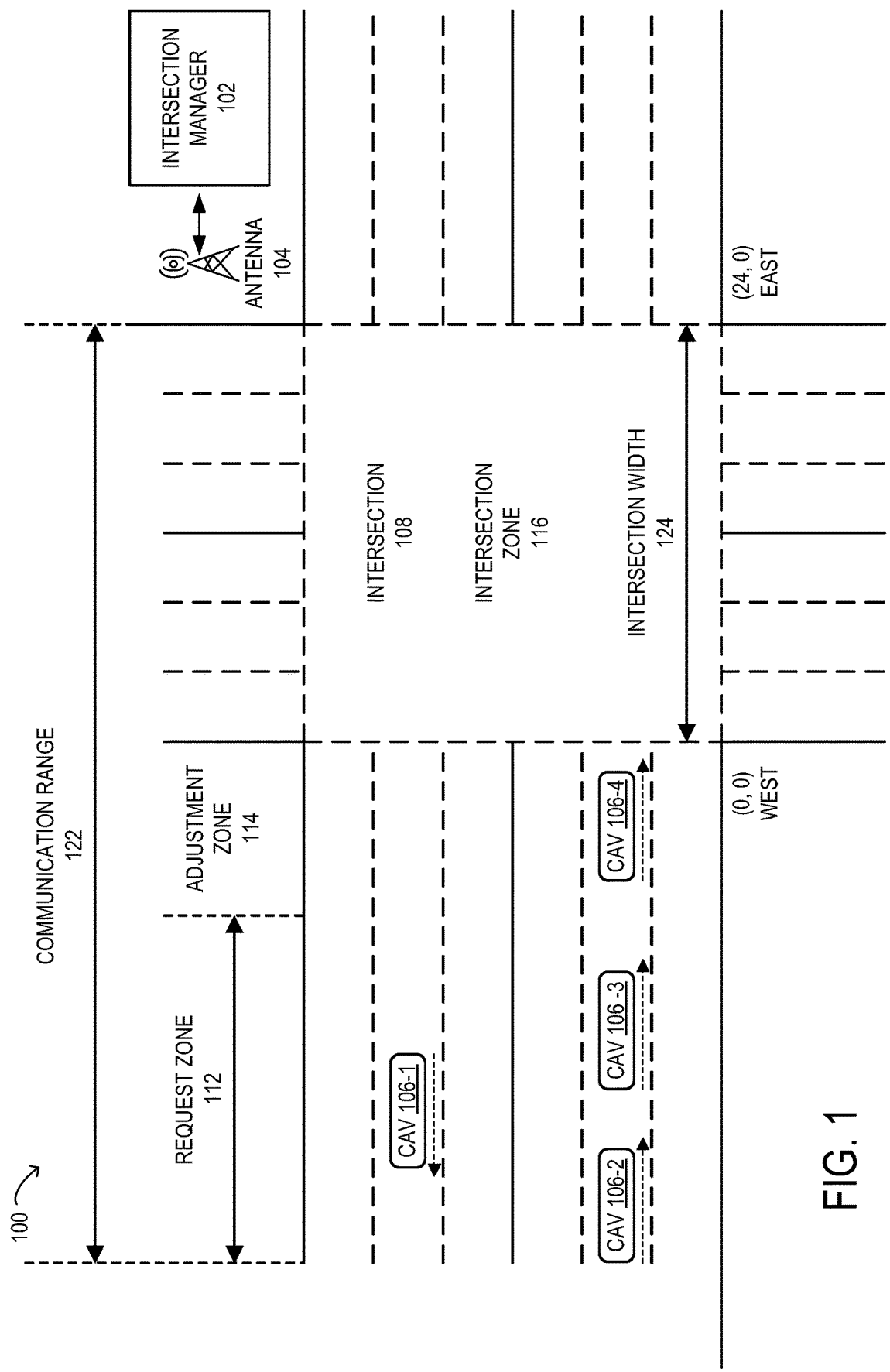
FIG. 1 is a block diagram of selected elements of an embodiment of a connected autonomous vehicle and intersection management system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

A solution is presented to the problem of dynamic space-time resource allocation for improving the movements of connected autonomous vehicles through intersections without traffic signals.

For the purpose of improving dynamic space-time resource allocation for improving traffic flow through intersections without traffic signals, a three-dimensional (3D) space-time resource model for maintaining the intersection resource information in both the two-dimensional (2D) space domain and the time domain is disclosed. In a space-time resource model, the trajectory of a connected autonomous vehicle through an intersection may be assigned a specific parallelepiped resource that may span both 2D space and time domains. Moreover, the dynamic space-time resource allocation problem may be simplified to a classic 3D container-packing problem. A disclosed dynamic heuristic algorithm, Best Parallelepiped Fit (BPF), to maintain steady traffic flow and improve space-time resource usage by adjusting the speed and entry time of each approaching connected autonomous vehicle through intersections. The performance of the disclosed algorithm (BPF) is evaluated using a traffic simulator under different traffic loads, and the results show the algorithm (BPF) can reduce the average travel delay and fuel consumption of connected autonomous vehicles.

The automotive industry is currently undergoing a significant transformation from human-driven to semi or fully autonomous vehicles (AVs). Several leading automakers and information technology companies around the world have announced their plans of deploying fully AVs by 2025, while testing of driver-free AVs on public roads has started recently.

Meanwhile, intersection traffic management remains a challenging issue for intelligent transportation systems (ITS). In the US, intersection-related accidents account for 44.8% of all crashes and 21.5% of all traffic fatalities. Moreover, intersections tend to become traffic bottlenecks, which lead to longer travel time and wasteful fuel consumption. Traditional intersection management methods, such as traffic lights and stop signs, may not be able to take full advantage of AVs. For example, AVs are capable of more accurate and reliable steering and speed control, which allow them to traverse intersections at a tighter inter-vehicle gap, thus improving overall traffic flow. In addition, AVs are expected to incorporate Vehicle-to-Vehicle (V2V) and Vehicle-to-Infrastructure (V2I) communications technologies (e.g., Dedicated Short Range Communication) for enhanced safety and traffic management. AVs are also referred herein as Connected Autonomous Vehicles (CAVs). These new technologies provide a tremendous potential for coordinating the movements of CAVs through signal-less intersections that are without conventional stop and go traffic signs or signals. One such approach to autonomous intersection management involves a system in which a CAV can reserve a block of unique space-time resource for traversing an intersection, while maintaining safety and minimizing the waiting time. Compared with the traditional traffic signal systems, autonomous intersection management (AIM) improves traffic throughput at intersections.

However, solutions for autonomous intersection management do not leverage an efficient resource management method to optimize the movements of CAVs through intersections. In practice, each approaching CAV may need to reserve a specific block of space-time resource in order to traverse the intersection safely. Meanwhile, as large numbers of CAVs are entering and exiting the intersection constantly, the resource may need to be allocated in a dynamic and intelligent way so as to reduce or avoid unnecessary waiting time and maintain continuous traffic flow. Hence, a need exists to design a dynamic intersection space-time resource allocation algorithm that may improve intersection throughput while providing for the safety of CAVs.

Intersection management for CAVs is a new challenge for ITS. Traditional signalized intersection management methods (e.g., traffic lights, stop signs, etc.) are designed and optimized for human drivers, which may not be well suitable for CAVs. This is because CAVs can use V2I communications instead of visual signals as a more advanced means for exchanging information with intersection management systems. Accordingly, the present document describes a design for a communication-based Intelligent Signal-less Intersection Management (ISIM) system to guide each approaching CAV through intersections. Three main principles to guide the design of the ISIM system.

The first principle is safety. Intersection safety is an important priority issue for the ISIM system. Collisions often happen at intersections because there are resource contending areas that are prone to conflicts. Without stop and go traffic signals, the ISIM system needs to allocate sufficient and exclusive block of space-time resources for each approaching CAV to ensure its safety.

The second principle is efficiency. Intersections tend to become the bottlenecks of the transportation system as the traffic increases. The ISIM system needs to allocate intersection space-time resources to CAVs efficiently in order to reduce traffic congestion and travel delay at the intersection area. The travel delay of a CAV crossing an intersection as the extra delay time caused by the slowing down or stopping of the CAV for safely traversing the intersection area is described further herein.

The third principle is fairness. The traversing sequence of CAVs is scheduled by the ISIM system. In the same lane, the first coming CAV should be served firstly. Furthermore, each approaching CAV in any lane should be able to eventually traverse the intersection without experiencing excessive delay. A dynamic intersection resource allocation algorithm should be designed to provide fairness among all CAVs in all lanes.

Turning now to FIG. 1, a block diagram of selected elements of an embodiment of a connected autonomous vehicle (CAV) and intersection management system (IMS) 100 is illustrated. IMS 100 may include, but is not limited to, an intersection manager (IM) 102, an antenna 104, and CAVs 106 including CAV 106-1, CAV 106-2, and CAV 106-3. IMS 100 may manage an intersection 108 having an intersection width 124.

IMS 100 may comprise a communication-based intelligent signal-less intersection management (ISIM) system. An IMS 100 may be established at each intersection for managing intersection traffic flow such as intersection 108. IMS 100 may guide each approaching CAV 106 through intersection 108 safely and smoothly. Intersection manager 102 may control intersection 108 and its surrounding areas. Intersection 108 and its surrounding areas may be divided into three zones including a request zone 112, an adjustment zone 114, and an intersection zone 116. IM 102 may utilize antenna 104 to communicate with CAVs 106 having a communication range 122. Communication range 122 may cover communication between IM 102 and CAVs 106 within request zone 112, adjustment zone 114, or intersection zone 116. All CAVs 106 within request zone 112, adjustment zone 114, or intersection zone 116 should follow the trajectories as instructed by IM 102.

Figure 2:
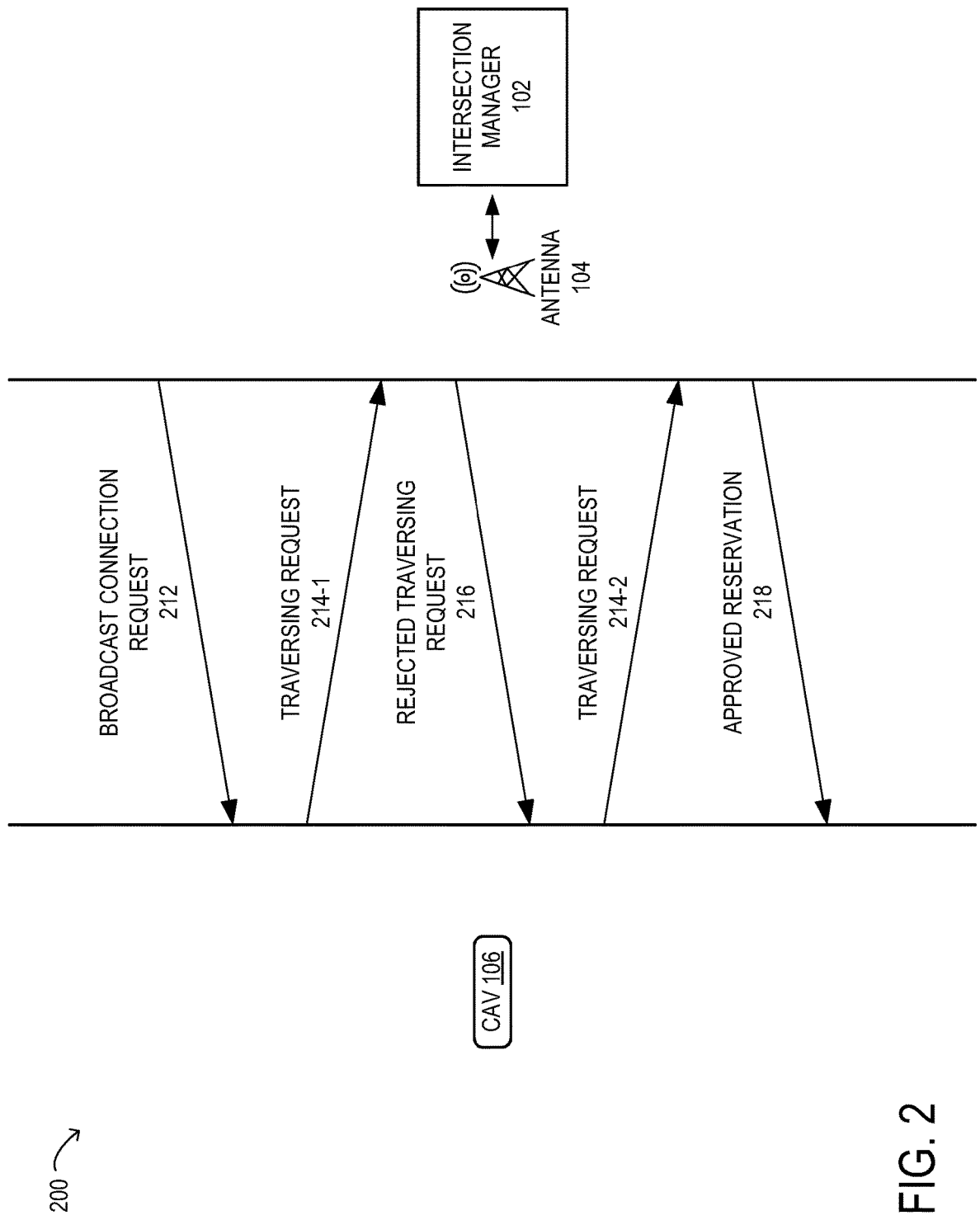
FIG. 2 is a diagram of connected autonomous vehicle and intersection manager communication.

During operation, IM 102 and each CAV 106 of CAVs 106 may communicate with each other as depicted in diagram 200 of FIG. 2 of CAV 106 and IM 102 communication. IM 102 may broadcast a connection request 212 to all CAVs 106 within request zone 112, adjustment zone 114, and intersection zone 116 to be connected to IM 102. When each CAV 106 receives the connection request 212 from IM 102 and determines that CAV 106 has entered request zone 112 of upcoming intersection 108, CAV 106 may send a traversing request 214-1, a vehicle to intersection manager message, to IM 102 to request a block of exclusive space-time resource of intersection zone 116. A traversing request 214 may include an earliest arrival time to intersection zone 116, a current vehicle speed, a position, an entry lane of intersection 108, a departure lane of intersection 108, a request failure count, and vehicle properties. The vehicle properties may include a vehicle identity number, a width, a length, a maximum speed, a maximum acceleration, and a maximum deceleration. The request failure count of a traversing request 214 may track the number of times a traversing request 214 of a CAV 106 has been denied by IM 102. When IM 102 receives traversing request 214-1 from a CAV 106, IM 102 may attempt to reserve a trajectory in terms of an exclusive block of space-time resource in a space-time resource model of intersection 108 to satisfy traversing request 214-1 from CAV 106. When IM 102 is unable to reserve a trajectory in the space-time resource model of intersection 108, IM 102 may send a rejected traversing request 216 back to CAV 106. When CAV 106 receives the rejected traversing request 216 from IM 102, CAV 106 may increment a request failure count associated with CAV 106. CAV 106 may also repeatably send other traversing requests 214 such as traversing request 214-2 to IM 102 to request a block of exclusive space-time resource of intersection zone 116 until an approved reservation 218 is received or CAV 106 enters adjustment zone 114 of intersection 108. Traversing request 214-2 may include an updated earliest arrival time to intersection zone 116, an updated current vehicle speed, and an updated position. When IM 102 receives traversing request 214-2 from a CAV 106, IM 102 may attempt to reserve a trajectory in terms of an exclusive block of space-time resource in a space-time resource model of intersection 108 to satisfy traversing request 214-2 from CAV 106. When IM 102 successfully reserves a trajectory in the space-time resource model of intersection 108, IM 102 may send an approved reservation 218 back to CAV 106. Approved reservation 218 may include a reserved trajectory including an entry time that a CAV enters the intersection zone, a traversing time of the CAV through the intersection zone, and a traversing speed of the CAV inside the intersection zone. The reserved trajectory is prescribed as the entry time that CAV 106 is to enter intersection zone 116 and the traversing speed of CAV 106 inside intersection zone 116.

IM 102 can assign a traversing speed among several speed choices to support vehicle properties and constraints of an individual CAV 106 as well as improve the space-time resource usage of intersection 108. Each CAV 106 must maintain a constant traversing speed as specified by IM 102 within intersection zone 116.

When approved reservation 218 corresponding to CAV 106 may have been received from IM 102, CAV 106 may stop sending any additional traversing requests 214 to IM 102. CAV 106 also takes responsibility for entering and traversing intersection zone 116 of intersection 108 following the reserved trajectory. CAV 106 may utilize adjustment zone 114 of intersection 108 to adjust speed, arrival time, and entry point based on approved reservation 218. If CAV 106 does not receive an approved reservation 218 within request zone 112 of intersection 108, CAV 106 may slow its speed in adjustment zone 114 so that CAV 106 may be able to fully stop before entering intersection zone 116 to avoid a collision. CAV 106 may also start sending urgent traversing requests (not shown) with the request failure count set to infinity. IM 102 schedules such urgent traversing requests with higher priority to minimize traffic slowdown.

Figure 3:
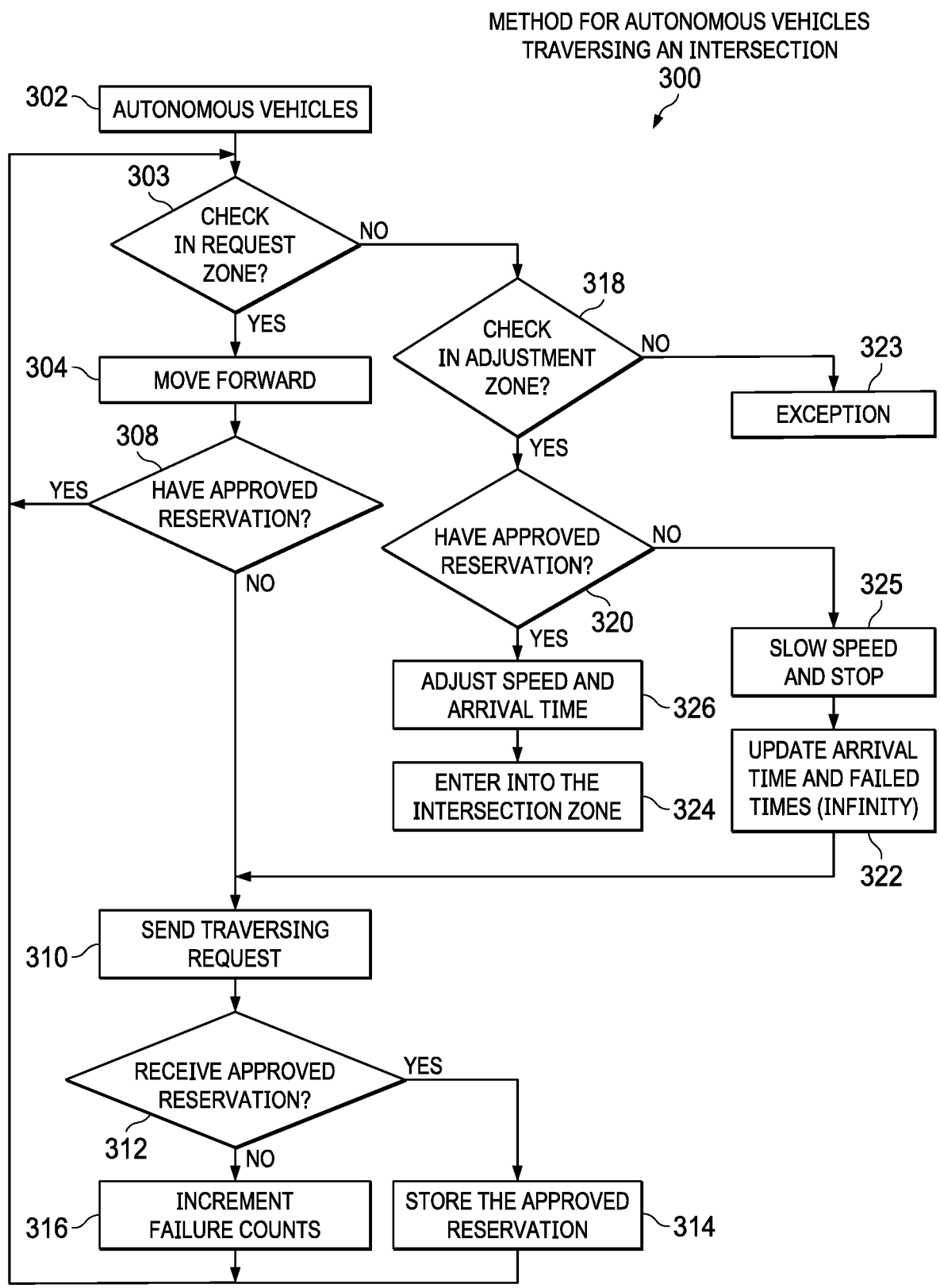
FIG. 3 is a flowchart of selected elements of an embodiment of a method for connected autonomous vehicles traversing an intersection.

Turning now to FIG. 3, a flowchart of selected elements of an embodiment of a method 300 for connected autonomous vehicles traversing an intersection, as described herein, is depicted. In various embodiments, method 300 may be performed using IMS 100 as previously described with reference to FIG. 1. It is noted that certain operations described in method 300 may be optional or may be rearranged in different embodiments.

Method 300 may begin at step 302, by receiving, by CAV 106, a connection request from IM 102. At step 303, determining, by CAV 106, whether the CAV 106 is in request zone 112 of intersection 108. When CAV 106 determines that it is in request zone 112, method 300 may proceed to step 304. Otherwise, method 300 may proceed to step 318. At step 304, moving, by CAV 106, forward towards request zone 112 of intersection 108. At step 308, determining, by CAV 106, whether CAV 106 has an approved reservation 218. When CAV 106 determines that it has approved reservation 218, method 300 may proceed back to step 303. Otherwise, method 300 may proceed to step 310. At step 310, sending, by CAV 106, a traversing request 214 to IM 102. At step 312, determining, by CAV 106, whether an approved reservation 218 has been received. When CAV 106 determines that approved reservation 218 has been received, method 300 may proceed to step 314. Otherwise, method 300 may proceed to step 316. At step 314, storing, by CAV 106, the approved reservation 218. Method 300 may proceed back to step 303. At step 316, incrementing, by CAV 106, a request failure count associated with CAV 106. Method 300 may proceed back to step 303. At step 318, determining, by CAV 106, whether CAV 106 is in adjustment zone 114.

When CAV 116 determines that CAV 106 is in adjustment zone 114, method 300 proceeds to step 320.

At step 320, determining, by CAV 106, whether CAV 106 has an approved reservation 218. When CAV 106 determines that it has approved reservation 218, method 300 may proceed to step 326. At step 326, adjusting, by CAV 106, speed, arrival time, and entry point based on approved reservation 218. Method 300 may proceed to step 324. At step 324, entering, by CAV 106, into intersection zone 116 of intersection 108. At step 320, when CAV 106 determines that it has not approved reservation 218, method 300 may proceed to step 325. At step 325, slowing and stopping, by CAV 106, prior to entering intersection 108. Method 300 proceeds to step 322. At step 322, updating, by CAV 106, earliest arrival time for CAV 106 and set the request failure count associated with CAV 106 to infinity. At step 318, when CAV 116 determines that CAV 106 is not in the adjustment zone 114, method 300 proceeds to step 323. At step 323, an exception is created.

Figure 4A:
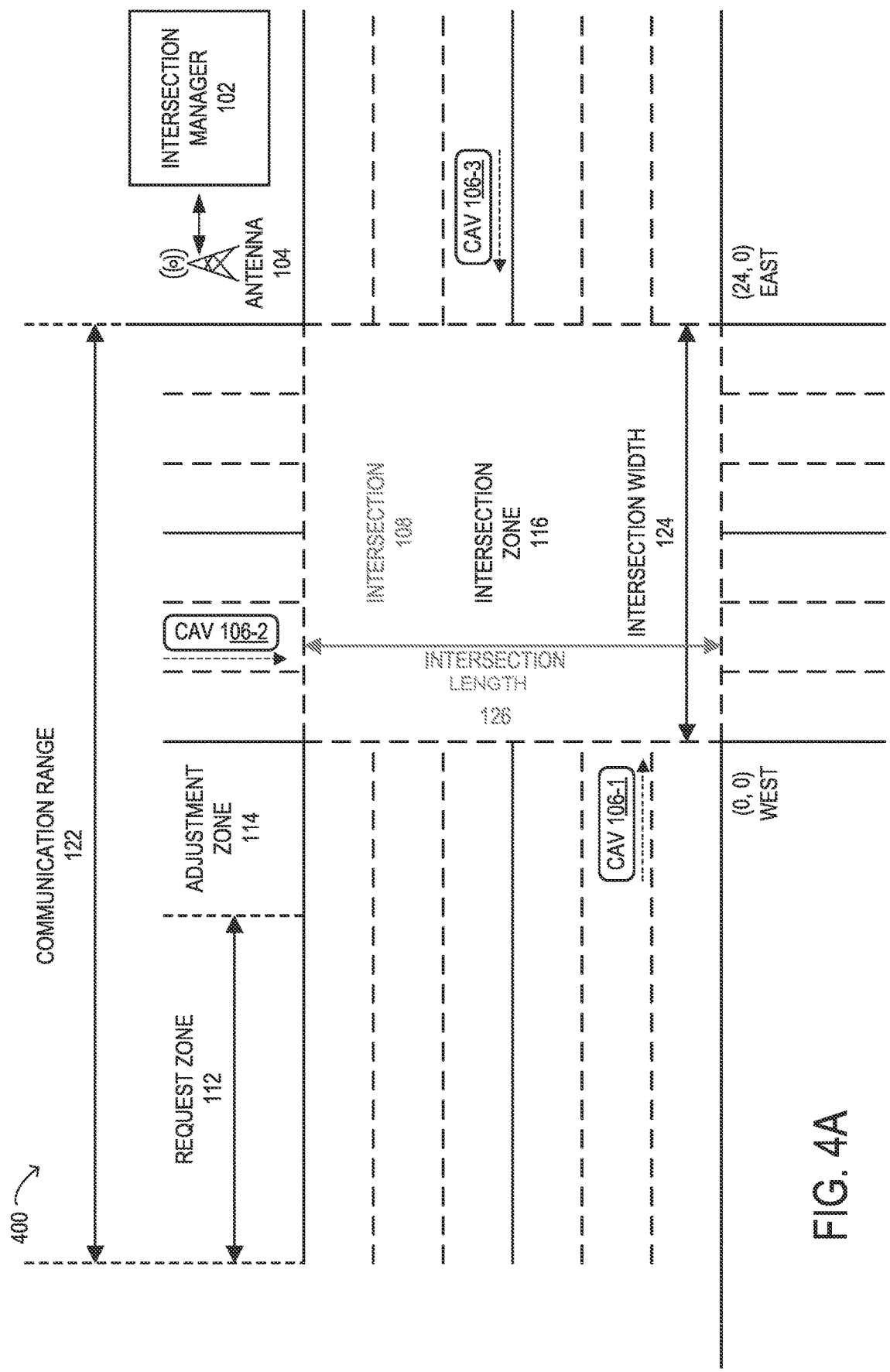
FIGS. 4A and 4B are an exemplary block diagrams of a connected autonomous vehicle and intersection management system and a space-time resource model of intersection resources of an intersection.
Figure 4B:
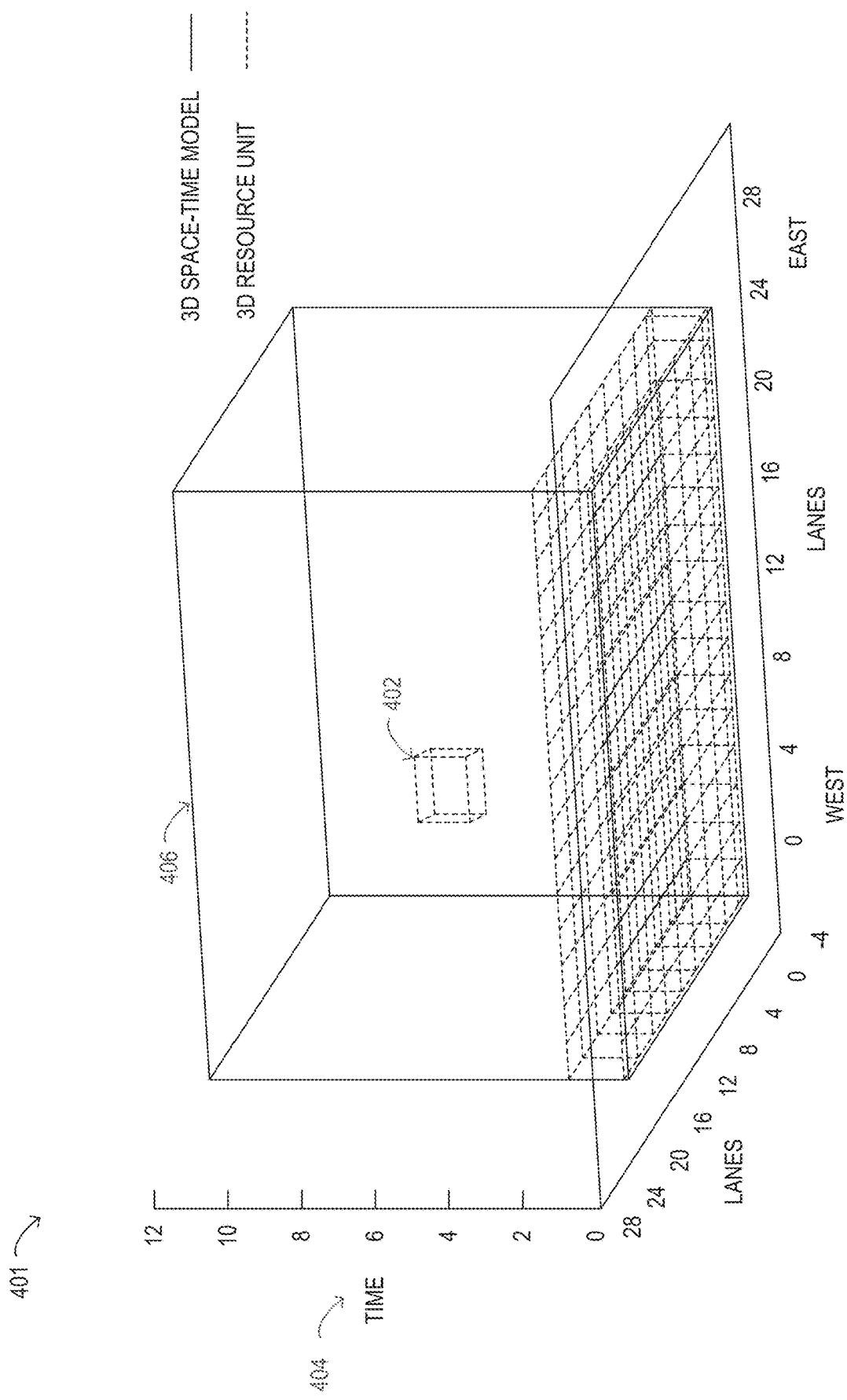

Referring to FIGS. 4A and 4B, an exemplary block diagram of CAV and IM 400 is illustrated in FIG. 4A and an exemplary space-time resource model 401 of intersection resources of an intersection is illustrated in FIG. 4B. IMS 400 may include, but is not limited to, IM 102, antenna 104, and CAVs 106 including CAV 106-1, CAV 106-2, and CAV 106-3. IMS 400 may manage intersection 108 having an intersection width 124.

For CAVs 106 to traverse intersection 108, each approaching CAV 106 needs to get a reserved block of space-time resource from IM 102. Space-time resource model 401 of intersection resources of intersection 108 is a three-dimensional (3D) model that represents the space-time resource information of intersection zone 116 of intersection 108. Space-time resource model 401 may include three dimensions including a time dimension and two-dimensional (2D) space. A minimal resource allocation unit 402 in space-time resource model 401 is a 3D rectangle that is shaped by a granularity of length, width, and height of a CAV 106. When one minimal resource allocation unit 402 is reserved by one traversing request 214, then this minimal resource allocation unit 402 is not available for other traversing requests 214.

In FIG. 4B, space-time resource model 401 is shown for a four-way intersection zone 116 with 6 lanes on each side of intersection zone 116 and a certain time domain. FIG. 4A shows intersection zone 116 of intersection 108 having an intersection width 124 of 24 meters and an intersection length 126 of 24 meters. The width of each lane is 4 meters. In FIG. 4B, space-time resource model 401 having a vertical axis that denotes a time domain 404 and the horizontal two-dimensional space denotes intersection zone 116. The two-dimensional space coordinate of southwest corner of intersection zone 116 is (0, 0). The large cube shows a 3D space-time resource 406, which indicates the resource condition of intersection zone 116 from time 0 to time 12 units. The small cube in the middle of space-time resource model 401 shows minimal resource allocation unit 402, whose length, width, and height are all one unit. 3D space-time resource 406 can be divided into many minimal resource allocation units 402.

Space-time resource model 401 may reserve and allocate 3D space-time resource 406 for each approaching CAV 106. The block of reserved 3D space-time resource 406 should be sufficient for a CAV 106 to safely traverse intersection zone 116 through a specific trajectory. A non-turning straight traffic in intersection zone 116 is also considered. The shape of all CAVs 106 may be a rectangle, and each CAV 106 may maintain a constant speed when traversing intersection zone 116. Thus, the allocated 3D space-time resource 406 for a CAV 106's trajectory can be represented as a parallelepiped in space-time resource model 401. IM 102 has multiple speed choices for a CAV 106. Hence, the traversing request 214 of a CAV 106 can be supported by parallelepipeds with different slopes that correspond to the speed choices. Also, the different entry times of CAVs 106 can be represented by parallelepipeds with different elevations. In addition, the trajectory of turning traffic including left turns and right turns can be represented by a smoothly curved 3D shape, a 'curved' parallelepiped, which can be approximated by a group of continuous parallelepipeds each with a slightly different turning angle.

Figure 5:
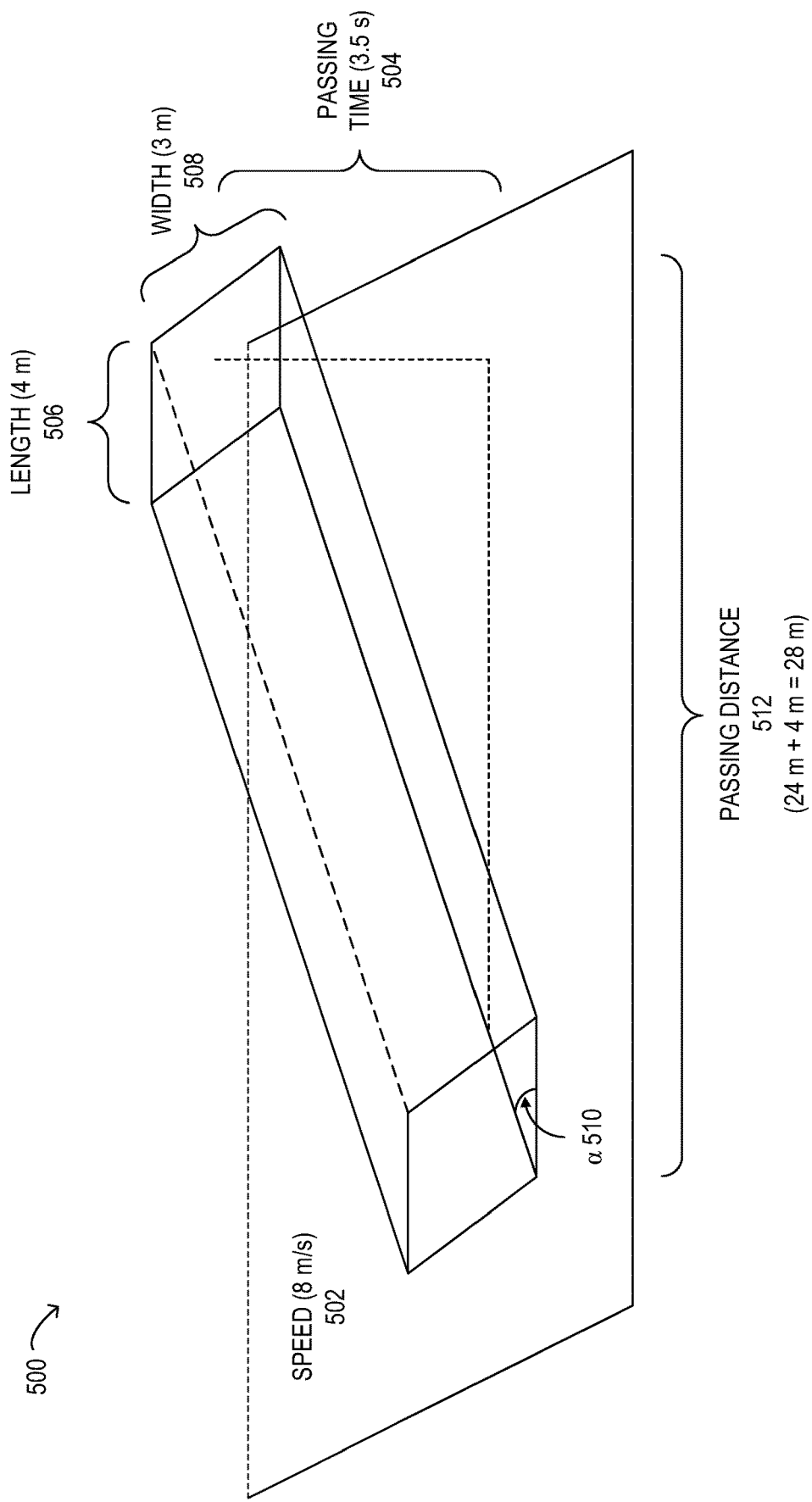
FIG. 5 is an example of reservation resources of a trajectory of an approaching connected autonomous vehicle of FIGS. 4A and 4B.
Figure 6:
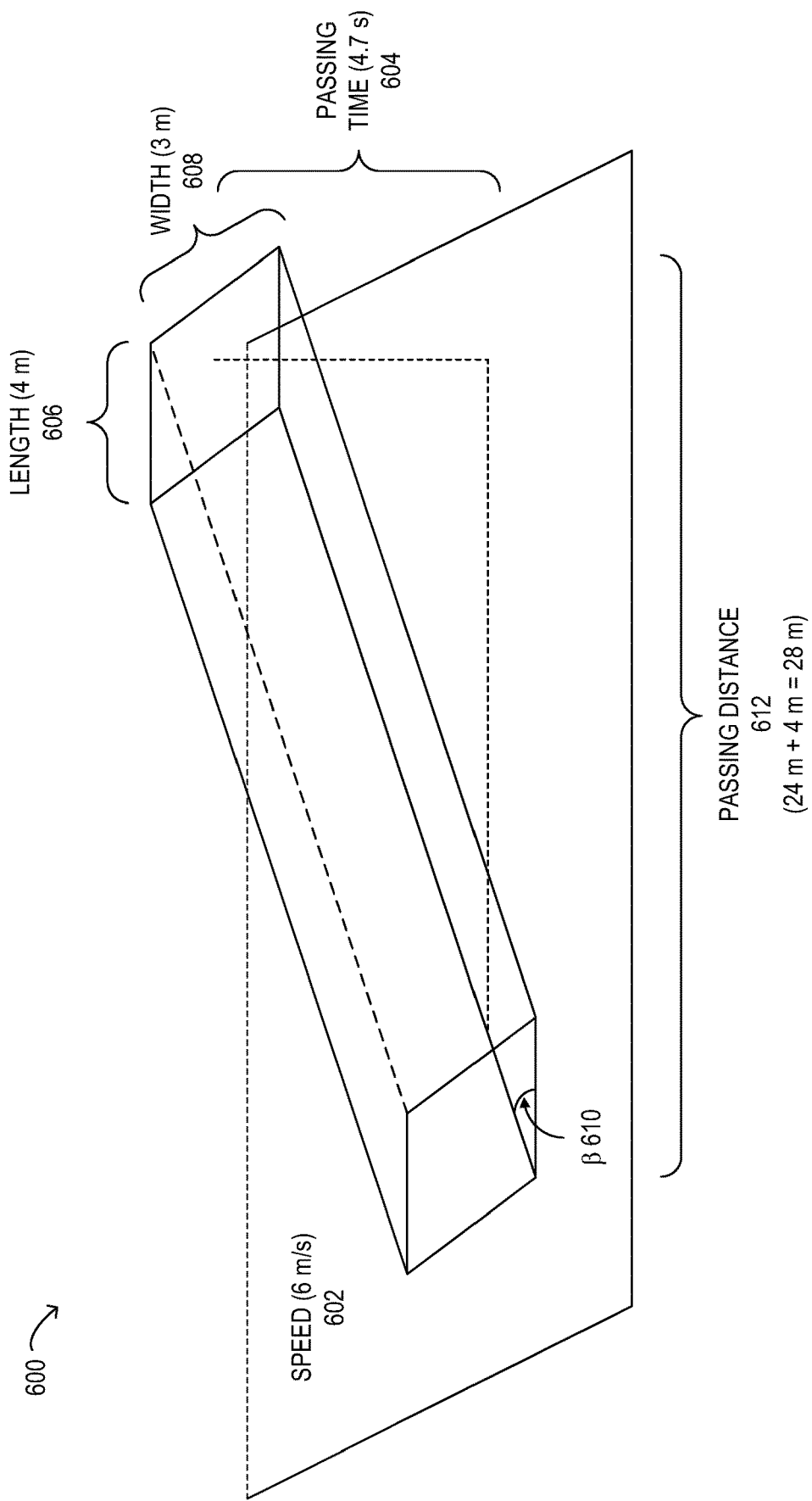
FIG. 6 is another example of reservation resources of a trajectory of the approaching connected autonomous vehicle of FIGS. 4A and 4B.

For example, in FIG. 4A, CAV 106-1 is going straight crossing intersection 108. CAV 106-1 may be 4 meters long and 3 meters wide. CAV 106-1 may have 8 m/s and 6 m/s speed choices for traversing intersection 108. In FIGS. 5 and 6, two parallelepipeds including parallelepiped 500 of FIG. 5 and parallelepiped 600 of FIG. 6 are shown with different slopes that may support CAV 106-1 with speeds of 8 m/s and 6 m/s. In FIG. 5, the base of parallelepiped 500 is a rectangle representing CAV 106-1 having a length 506 of 4 meters and a width 508 of 3 meters. A height of parallelepiped 500 is a traversing time 504 of 3.5 seconds, meaning that CAV 106-1 needs 3.5 seconds to traverse intersection zone 116. The reciprocal of the slope ($1/\tan(\alpha\ 610)$) is a speed 602 of 8 m/s. In FIG. 6, parallelepiped 600 shows that 4.7 seconds of traversing time 604 is needed to traverse intersection zone 116 if IM 102 decides a 6 m/s ($1/\tan(\beta\ 710)$) speed for CAV 106-1.

Figure 7:
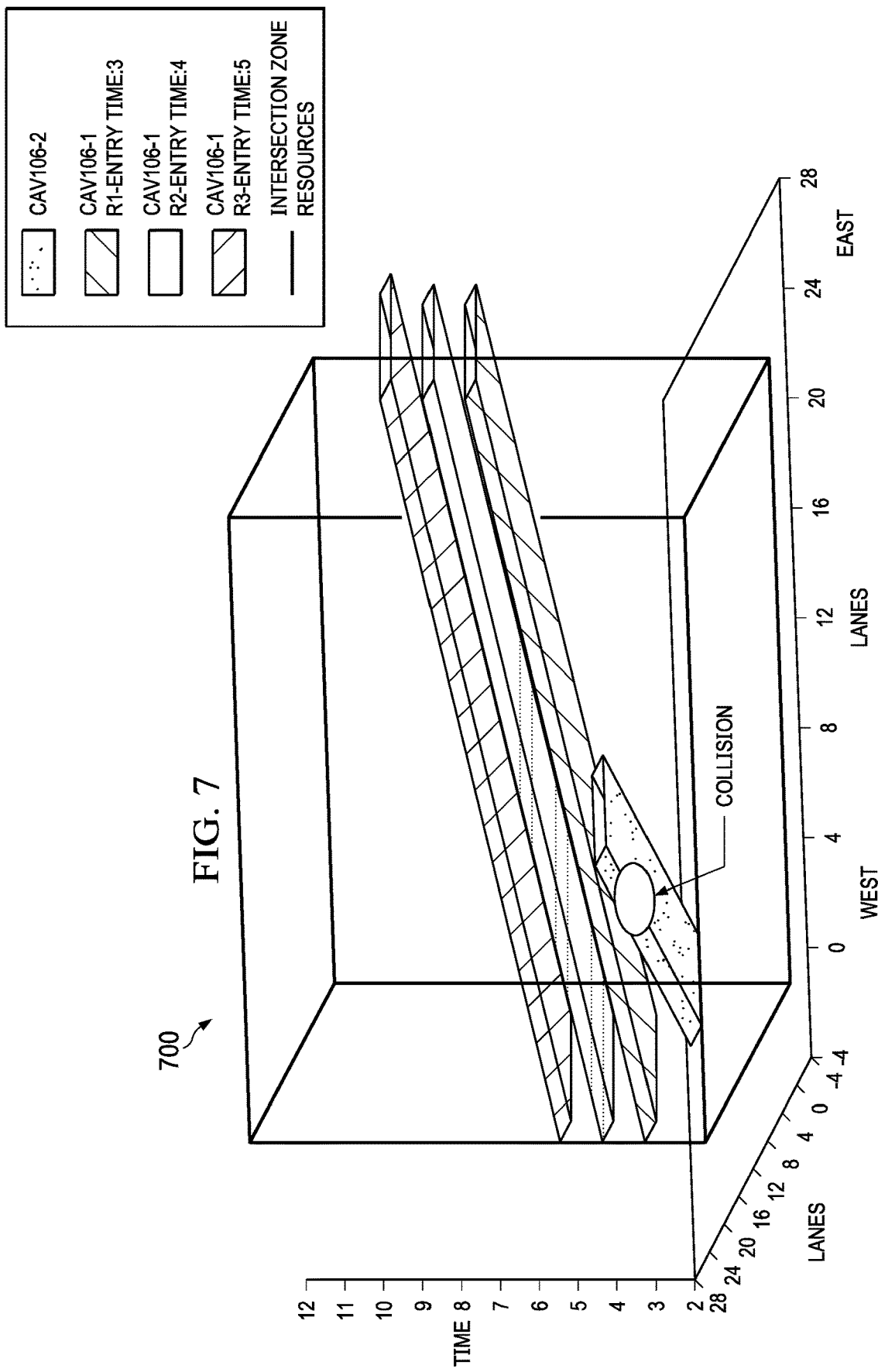
FIG. 7 is an example of a space-time resource model of intersection resources of the intersection for an approaching connected autonomous vehicle of FIGS. 4A and 4B.

In this manner, the trajectory of each approaching CAV 106 can be determined by the reserved entry time and traversing speed. FIG. 7 shows three different trajectories based on parallelepiped 700 with speed 6 m/s over three different entry times including entry times R1, R2, and R3. In an example, the entry times R1, R2, and R3 of the trajectories of CAV 106-1 are 3, 4, and 5, respectively. In FIG. 7, the trajectory of CAV 106-2 from north to south has been reserved for CAV 106-2. The trajectory of CAV 106-1 for entry time R1 overlaps with the reserved trajectory of CAV 106-2, meaning expected collision 702 between CAV 106-1 and CAV 106-2, if entry time R1 and speed 6 m/s are allocated to CAV 106-1. Following the other two trajectories, however, CAV 106-1 can traverse intersection 108 safely. Note that the trajectory of CAV 106-1 for entry time R2 (4) can be better than the trajectory of vehicle CAV 106-1 for entry time R1 (5) as the entry time R2 (4) is an earlier entry time as compared to entry time R1 (5), resulting in less travel delay for CAV 106-1.

The 3D space-time resource 406 reserved for a CAV 106's intersection traversing request 214 can be denoted as a parallelepiped in the space-time resource model 401. For each CAV 106, different parallelepipeds with different speed choices and entry times can be considered. In addition, since CAVs 106 arrive from all directions and all lanes constantly, IM 102 needs to provide resource reservation for multiple CAVs at a time. Any placement of a group of non-overlapping parallelepipeds, which implies trajectories of multiple CAVs 106, is a solution for a group of approaching CAVs 106. Hence, the 3D space-time resource 406 allocation problem for approaching CAVs 106 can be simplified to a classic 3D container-packing problem, which is a representative NP-hard problem (non-deterministic polynomial-time hardness). The space-time resource allocation algorithm uses a different heuristic to find placement solutions for different parallelepipeds, such that the space-time resource model 401 can accommodate as many parallelepipeds of requests as possible.

The space-time resource allocation algorithm may utilize a sliding time window and a solution space to find placement solutions for different parallelepipeds. The sliding time window may include a time frame for when a respective CAV 106 may be allowed to enter intersection zone 116 for each of the one or more traversing requests 214. The time frame may be from an earliest entry time of a CAV 106 to intersection zone 116 to the sum of the earliest entry time and a time buffer. IM 102 may calculate the earliest entry time based on a current speed and a current position of the respective CAV 106. IM 102 may calculate the time buffer based on a request failure count of one or more traversing requests 214 corresponding to the respective CAV 106. The time buffer may be equal to 2 to the power of the request failure count. The sliding time window may be the time frame from the earliest entry time to the earliest entry time plus the time buffer.

The determination of a solution space for each of the one or more traversing requests 214 may be based on the sliding time window for the respective CAV 106 and one or more different traversing speeds over one or more different entry times within the sliding time window. The solution space may be the 3D space that includes all possible placements of different parallelepipeds based on the one or more different traversing speed choices over one or more different entry times. If a CAV 106 is given a bigger solution space, CAV 106 may have a higher probability of obtaining the requested 3D space-time resource 406.

Figure 8:
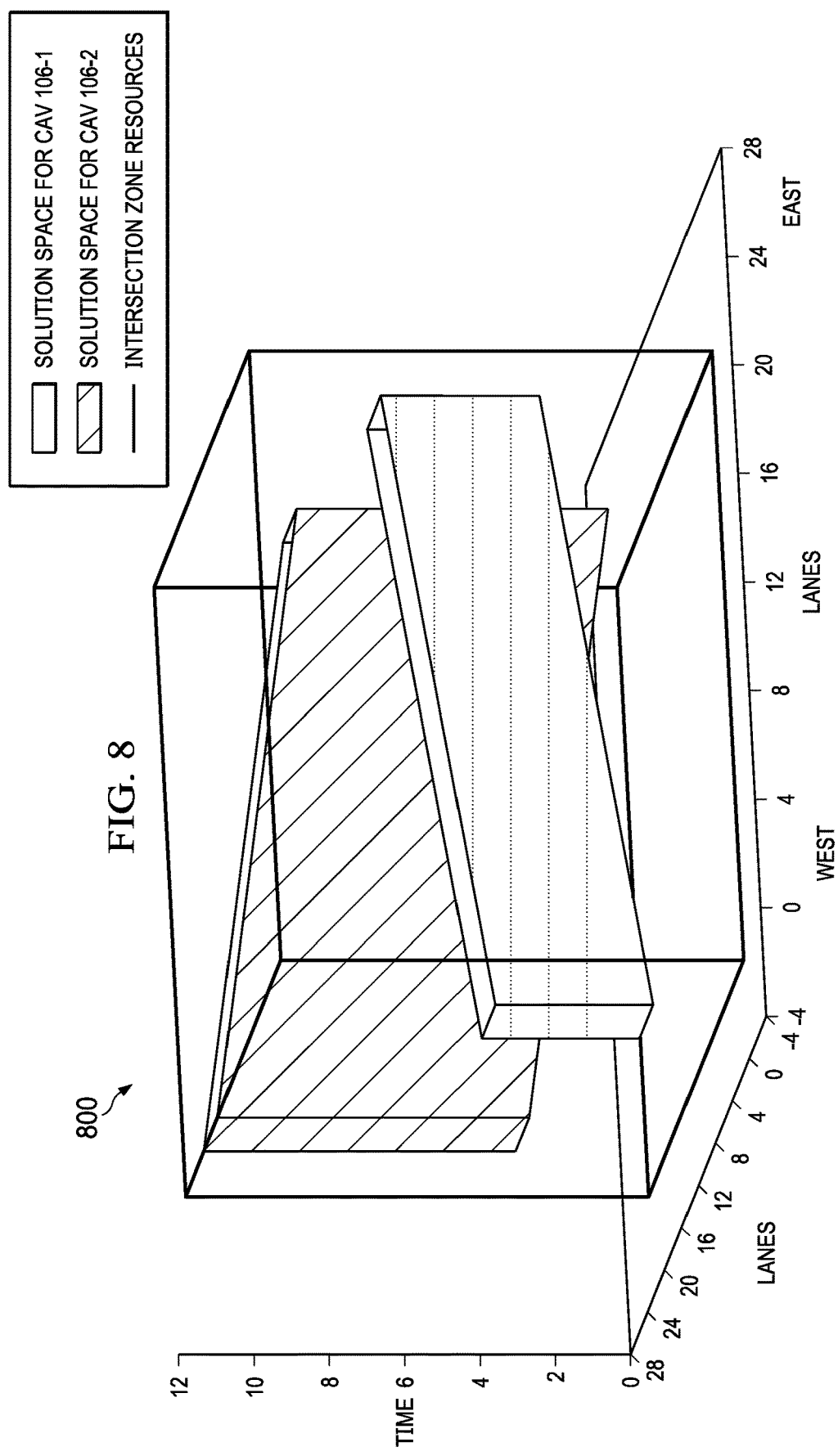
FIG. 8 is another example of a space-time resource model of intersection resources of the intersection for other approaching connected autonomous vehicles of FIGS. 4A and 4B.

For example, in FIG. 4A, both CAV 106-1 and CAV 106-3 are going straight crossing intersection zone 116. In an example, it can be assumed that the earliest entry time of CAV 106-1 and CAV 106-3 can be 2 and 1, respectively. Additionally, in the example, it can be assumed that the request failure count of CAV 106-1 and CAV 106-3 is 2 and 3, respectively. Hence, the sliding time window for CAV 106-1 is $[2, 2+2^2]1=[2, 6]$. That is, the sliding time window for CAV 106-1 is between 2 and 6. The sliding time window for CAV 106-3 is $[1, 1+2^3]=[1, 9]$. That is, the sliding time window for CAV 106-3 is between 1 and 9. In addition, continuing the example, it is assumed that CAV 106-1 and CAV 106-3 each has only one speed choice: 12 m/s and 8 m/s, respectively. FIG. 8 shows the solution space for CAV 106-1 and the solution space for CAV 106-2.

Leveraging space-time resource model 401, a best parallelepiped fit (BPF) space-time resource allocation algorithm may allocate a parallelepiped 3D space-time resource 406 for each CAV 106 crossing intersection 108. Based on the solution space discussed above, the BPF space-time resource allocation algorithm may determine the placement of a group of parallelepipeds to maximize intersection traffic throughput of intersection 108. The BPF space-time resource allocation algorithm comprises three phases including a first phase to filter the traversing requests 214 from all approaching CAVs 106 and constructing an initial set of traversing request 214, a second phase to determine a processing sequence for the traversing requests 214 in the initial set, and a third phase to calculate the solution space and find a best-possible placement solution for the traversing requests 214.

In the first phase, IM 102 may collect the traversing requests 214 received from all approaching CAVs 106 at each time step. To maintain fairness, IM 102 may only accept the traversing request 215 from the front-most CAV 106 in each lane of intersection 108. Note that the relative position among CAVs 106 can be deducted from the position information contained in the traversing request 214. All these traversing requests 214 may be stored in an initial set of traversing requests 214.

In the second phase, each approaching CAV 106 may update its request failure count based on each rejected traversing request 216 from IM 102. If the traversing request 214 of a CAV 106 is rejected by IM 102, CAV 106 may increment its request failure count by one and may send another traversing request 214 at the next time step. Meanwhile, based on the descending order of request failure counts of each traversing request 214, IM 102 may construct a processing sequence for all traversing requests 214 in the initial set of traversing requests 214. The traversing request 214 with the largest failure count may be placed in the headmost position in this processing sequence, which will be processed first. If two or more CAVs 106 have a same request failure count, their processing sequence may be randomly decided.

In the third phase, based on the request failure count, IM 102 may calculate the sliding time window for each traversing request 214 in the processing sequence. In addition, the solution space of each traversing request 214 may be calculated based on the sliding time window and different speed choices. The traversing requests 214 may then be processed one by one in this processing sequence. For each traversing request 214, IM 102 may find a parallelepiped placement within the traversing request's own solution space which may result in zero overlapping or minimal overlapping with other pending traversing requests 214 solution spaces. By doing so, the subsequent traversing requests 214 may have a better chance of finding mutually non-overlapping solutions among their solution spaces. In case the overlapping of two or more parallelepiped placement choices has the same overlapping volume, IM 102 may select a parallelepiped placement that has the earliest entry time. Since each traversing request is sequentially assigned a parallelepiped that is non-overlapping with all previous parallelepipeds, all traversing requests 214 will get non-overlapping 3D space-time resource 406 in the end, thereby ensuring collision-free intersection traversing. Each parallelepiped placement decides both the traversing speed and the entry time of CAV 106.

The disclosed BPF space-time resource allocation algorithm is numerically evaluated through simulations. A simulator implementing intersection zone 116 shown in FIG. 1, as well as its surrounding request zones 112 and adjustment zones 114 in all directions. The numerical values of the intersection 108 previously described in reference to FIGS. 4A and 4B, which is a 4-way intersection with 24 meters width, 6 lanes per road and 4 meters width per lane. Based on the same traffic load for each lane, five types of CAVs 106 with different specifications are randomly generated as shown in table I 900 of FIG. 9 is a table of simulation parameters for simulating the BPF space-time resource allocation algorithm.

For simplicity, it is assumes that the width and the length of all CAVs are 3 meters and 4 meters, respectively. The middle lane of each road only generates non-turning traffic. The left-most lane generates non-turning traffic and left-turning traffic with a mix ratio of 1:1. In a similar way, the right-most lane generates non-turning traffic and right-turning traffic with a mix ratio of 1:1. Hence, the mix ratio among non-turning traffic, left-turning traffic and right-turning traffic is 4:1:1. The classic vehicle following model is applied to CAVs 106 in the simulation, and CAVs 106 are not allowed to change lanes within request zone 112, adjustment zone 114, and intersection zone 116. Traversing requests 214, rejected traversing requests 216, and approved reservations 218 are between CAVs 106 and IM 102 and are sent and received through Dedicated Short Range Communications (DSRC) technology, which is able to support approximately 1 kilometer communication distance.

Based on the reserved entry time and traversing speed, the travel delay for each CAV crossing the intersection is defined as shown in the following formula:

$$T = At - Et + Td/Rs - Td/Ts$$

In the above formula, T is the travel delay, $Et$ and $At$ are the earliest entry time and the reserved entry time for entering intersection zone 116, respectively. $Td$ is the traversing distance in intersection zone 116 with CAV 106 length included. $Rs$ and $Ts$ are the reserved speed and the target speed within intersection zone 116, respectively. As mentioned previously, IM 102 has several speed choices for each CAV 106. The target speed is the maximal speed among all speed choices. Therefore, the reserved speed is equal or less than the target speed. According to this definition, if a CAV 106 can enter the intersection 108 at its earliest possible entry time, in other words, maintaining its original speed without slowing down at the adjustment zone 114, and can also traverse the intersection at the highest possible speed, CAV 106 will experience zero travel delay for crossing the intersection 108.

Figure 10:
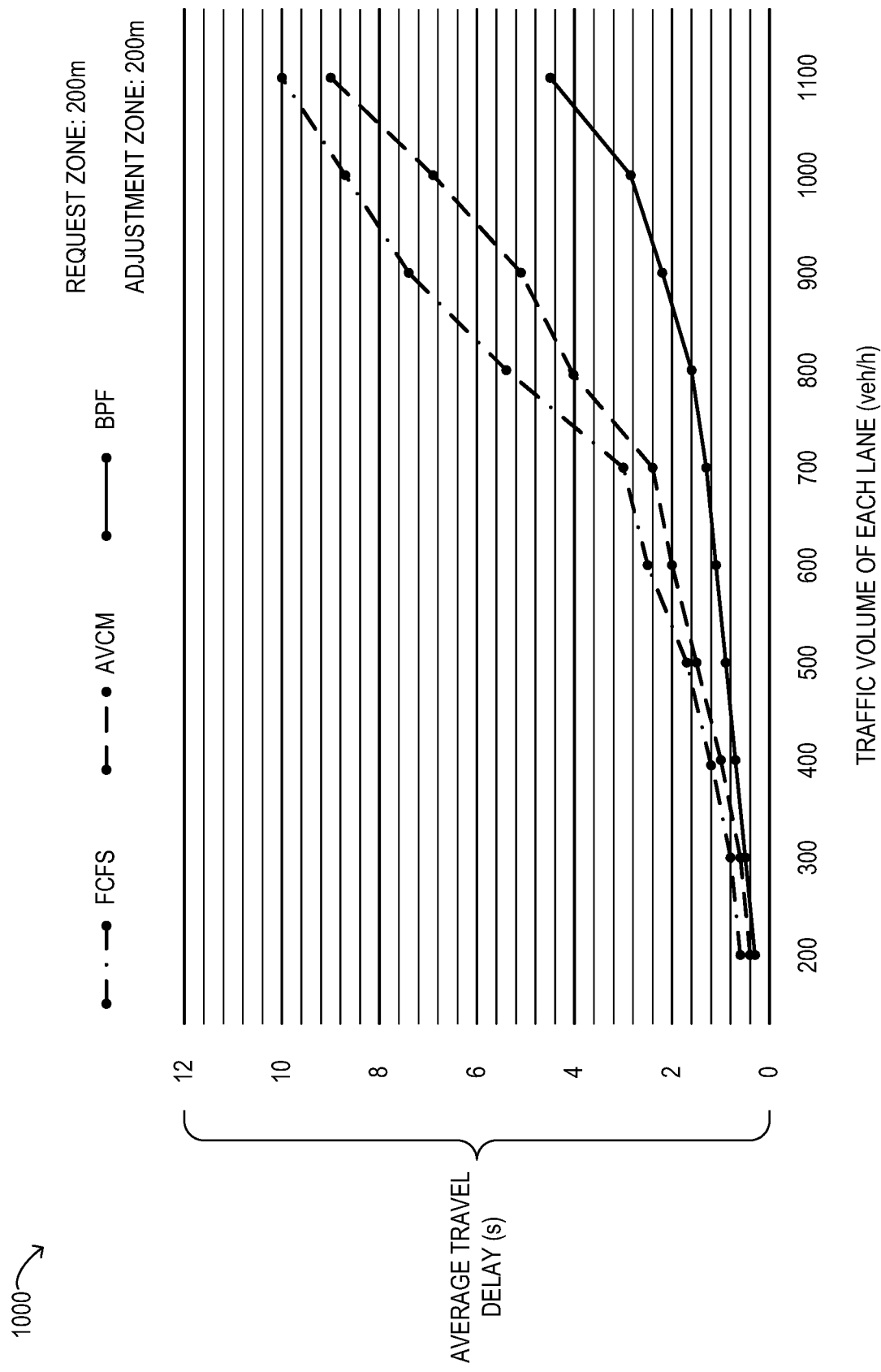
FIG. 10 is a graph of simulation results for average travel delay of a best parallelepiped fit space-time resource allocation algorithm.
Figure 11:
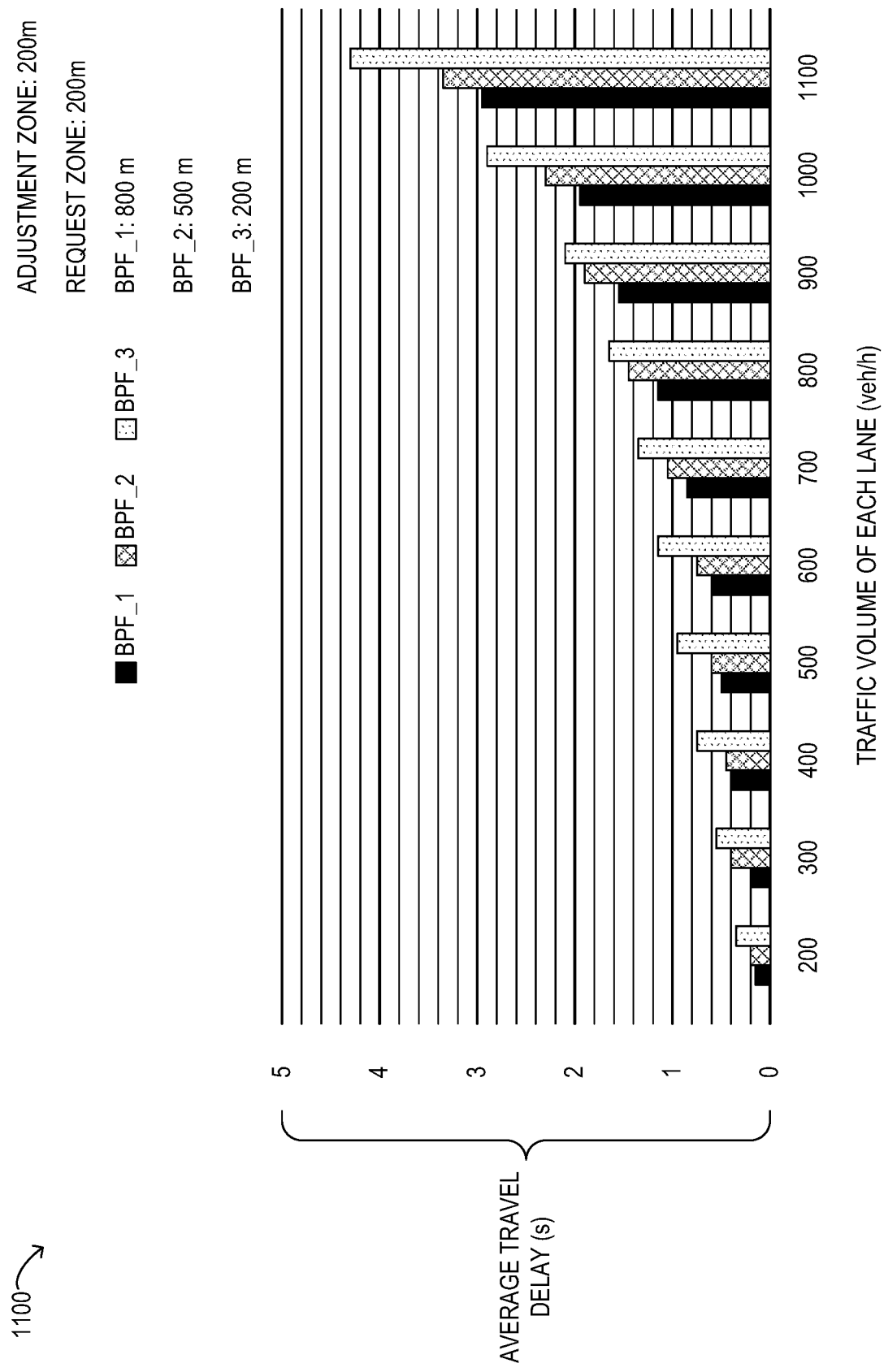
FIG. 11 is a bar graph of simulation results for average travel delay of a best parallelepiped fit space-time resource allocation algorithm.

Referring now to FIG. 10, a graph of simulation results for average travel delay of BPF space-time resource allocation algorithm is shown. In FIG. 10, the average travel delay is evaluated among BPF, AVCM, and FCFS based on different traffic loads. The lengths of the request zone 112 and the adjustment zone 114 are all set to 200 meters. IM 102 has two speed choices: 50 km/h and 55 km/h. Compared to the other two algorithms, the results indicate that BPF achieves a lower average travel delay. The main reason for this result is that the disclosed BPF space-time resource allocation algorithm efficiently allocates space-time resource in the space-time resource model 401 to each approaching CAV 106. Referring now to FIG. 11, a bar graph of simulation results for average travel delay of BPF space-time resource allocation algorithm is shown. Furthermore, FIG. 11 compares the average travel delay for BPF with different lengths of the request zone. The length of the request zone for BPF_1, BPF_2, and BPF_3 are 800, 500, and 200 meters, respectively. The results indicate that BPF_1 has the longest request zone 112 achieves the lowest travel delay. This is because the longer the request zone 112, the earlier a CAV 106 can send the traversing request 214. Consequently, IM 102 can plan further ahead in space-time resource model 401, with more chances of finding more optimized allocations of space-time resource for upcoming CAVs 106.

Figure 12:
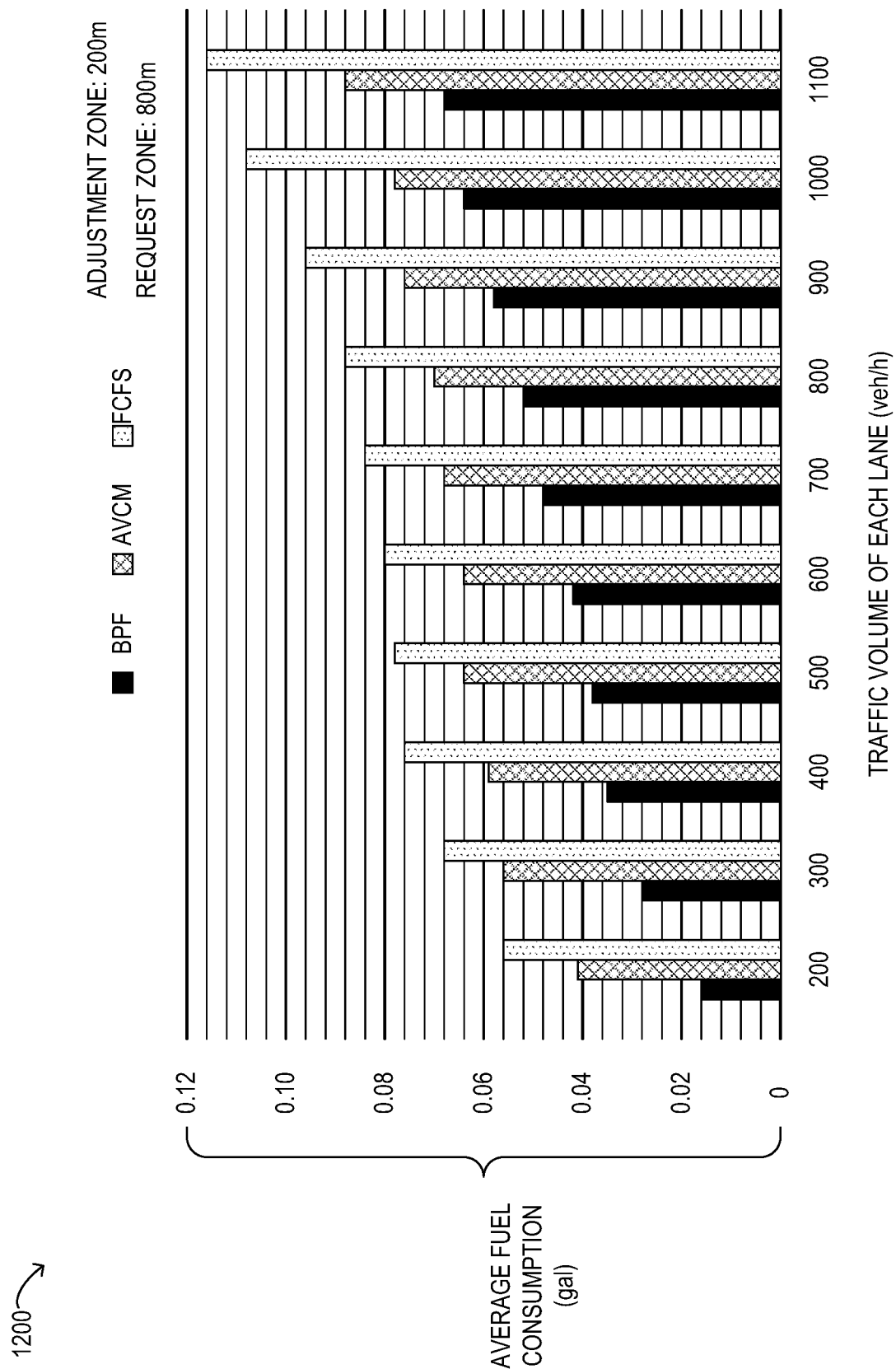
FIG. 12 is a bar graph of simulation results for average fuel consumption of a best parallelepiped fit space-time resource allocation algorithm.

The Virginia Tech Comprehensive Power-based Fuel Consumption Model-1 (VT-CPFM-1) is utilized to evaluate the fuel consumption of CAVs at different traffic loads. In this model, the instantaneous power is the key factor for calculating the fuel consumption. Braking and accelerating will consume more fuel than constant speed advancing. Referring now to FIG. 12, a bar graph of simulation results for average fuel consumption of BPF space-time resource allocation algorithm is shown. FIG. 12 shows the average fuel consumption through the intersection area among BPF, AVCM, and FCFS. Here the lengths of the request zone 112 and the adjustment zone 114 are 800 meters and 200 meters, respectively. Note that in reality these lengths may be set shorter to account for the length of the intersection 108 as well as the effective range of DSRC. Since BPF space-time resource allocation algorithm allows more CAVs 106 to traverse the intersection 108 at a higher and constant speed, it has much lower average fuel consumption than the other algorithms.

Figure 13:
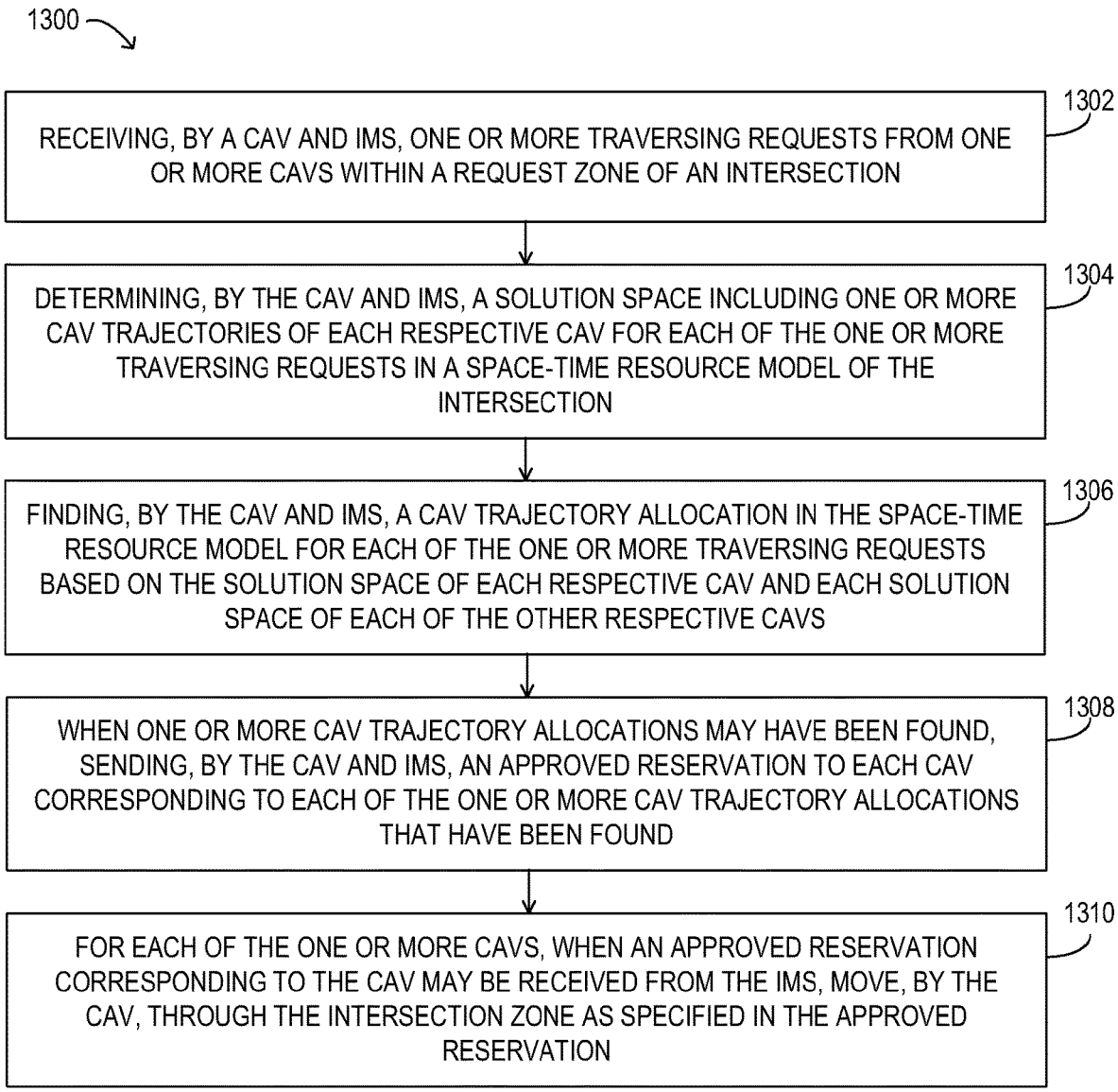
FIG. 13 is a flowchart of selected elements of an embodiment of a method for managing autonomous vehicle traffic at an intersection.

Referring now to FIG. 13, a flowchart of selected elements of an embodiment of a method 1300 for managing autonomous vehicle traffic at an intersection, as described herein, is depicted. In various embodiments, method 1300 may be performed using IMS 100 as previously described with reference to FIG. 1. It is noted that certain operations described in method 1300 may be optional or may be rearranged in different embodiments.

Method 1300 may begin at step 1302, by receiving, by a IMS, one or more traversing requests from one or more CAVs within a request zone of an intersection. Each of the one more traversing requests may correspond to a respective CAV of the one or more CAVs. At step 1304, determining, by CAV 106 and IMS, a solution space including one or more CAV trajectories of each respective CAV for each of the one or more traversing requests in a space-time resource model of the intersection. Each of the one or more CAV trajectories of each respective CAV may be represented by a parallelepiped including a traversing time, a traversing speed, and a CAV size. At step 1306, finding, by CAV 106 and IMS, a CAV trajectory allocation in the space-time resource model for each of the one or more traversing requests based on the solution space of each respective CAV and each solution space of each of the other respective CAVs. At step 1308, when one or more CAV trajectory allocations may have been found, sending, by CAV 106 and IMS, an approved reservation to each CAV corresponding to each of the one or more CAV trajectory allocations that have been found. At step 1310, for each of the one or more CAVs, when an approved reservation corresponding to CAV 106 may be received from IM 102S, move, by CAV 106, through intersection zone 116 as specified in the approved reservation.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. An intersection management system (IMS) comprising:
    a memory;
    a processor; and
    a space-time resource allocation algorithm stored within the memory and executable by the processor, the space-time resource allocation algorithm configured to:
        receive one or more traversing requests from one or more Connected Autonomous Vehicles (CAVs) within a request zone of an intersection, wherein each of the one or more traversing requests corresponds to a respective CAV of the one or more CAVs;
        determine a Best Parallelepiped Fit (BPF) solution space comprising one or more CAV trajectories of each respective CAV for each of the one or more traversing requests in a space-time resource model of the intersection, the space-time resource model includes three dimensions including a time dimension and two-dimensional space and each of the one or more CAV trajectories of each respective CAV is represented by a parallelepiped comprising a traversing time, a traversing speed, and a CAV size;
        find a CAV trajectory allocation in the space-time resource model for each of the one or more traversing requests based on the solution space of each respective CAV and each solution space of each of the other respective CAVs; and
        when one or more CAV trajectory allocations have been found, send an approved reservation to each CAV corresponding to each of the one or more CAV trajectory allocations that have been found, such that each CAV is instructed to move through the intersection as specified in the approved reservation.

2. The IMS of claim 1, wherein the space-time resource allocation algorithm is further configured to, prior to the determination of the solution space for each of the one or more traversing requests:
    allocate a sliding time window for when the respective CAV, of the one or more CAVs, is allowed to enter the intersection for each of the one or more traversing requests, wherein the sliding time window comprises a time frame from an earliest entry time to the intersection to a sum of the earliest entry time and a time buffer, wherein the earliest entry time is calculated based on a current speed and a current position of the respective CAV and the time buffer is calculated based on a traversing request failure count of the traversing request of the one or more traversing requests corresponding to the respective CAV, and wherein
    the determination of the solution space for each of the one or more traversing requests is based on the sliding time window for the respective CAV and one or more different traversing speeds over one or more different entry times.

3. The IMS of claim 1, wherein the space-time resource allocation algorithm is further configured to, prior to the determination of the solution space for each of the one or more traversing requests:
    determine a processing sequence for the one or more traversing requests based on a traversing request failure count of each of the one or more traversing requests, and wherein the determination of the solution space for each of the one or more traversing requests is processed based on the determined processing sequence for the one or more traversing requests.

4. The IMS of claim 1, wherein the space-time resource allocation algorithm is further configured to:
    when one or more CAV trajectory allocations failed, send a rejected traversing request to each CAV corresponding to each of the one or more CAV trajectory allocations that failed.

5. The IMS of claim 1, wherein each of the one or more CAVs is further configured to:
    when a rejected traversing request corresponding to the CAV is received from the IMS:
    increment a request failure count associated with the CAV; and
    send a traversing request to the IMS until one of an approved reservation is received corresponding to the traversing request and the CAV enters an adjustment zone of the intersection.

6. The IMS of claim 1, wherein each of the one or more CAVs is further configured to:
    when the CAV is in an adjustment zone of the intersection, adjust speed, arrival time, and entry point based on the approved reservation.

7. The IMS of claim 1, wherein each of the one or more CAVs is further configured to:
    when the approved reservation corresponding to the CAV is received from the IMS, stop sending any additional traversing requests to the IMS.

8. The IMS of claim 1, wherein each of the one or more CAVs is further configured to:
    when a connection request is received from the IMS:
    set a request failure count to zero;
    determine an earliest arrival time to the intersection; and
    send a traversing request to the IMS comprising the earliest arrival time to the intersection, a current vehicle speed, a position, an entry lane, a departure lane, the request failure count, and vehicle properties.

9. The IMS of claim 1, wherein a traversing request comprises an earliest arrival time to the intersection, a current vehicle speed, a position, an entry lane, a departure lane, a request failure count, and vehicle properties, wherein the vehicle properties comprise a vehicle identity number, a width, a length, a maximum speed, a maximum acceleration, and a maximum deceleration.

10. The IMS of claim 1, wherein the approved reservation comprises a reserved trajectory including an entry time that a CAV enters the intersection, a traversing time of the CAV through the intersection, and a traversing speed of the CAV inside the intersection.

11. The IMS according to claim 1, wherein the space-time allocation algorithm is a BPF algorithm that determines placement of the parallelepipeds representing each of the one or more CAV trajectories within the three dimensions of the space-time resource model to maximize intersection traffic throughput through the intersection.

12. The IMS according to claim 11, wherein travel delay (T) for each CAV moving through the intersection is represented by $T = At - Et + Td/Rs - Td/Ts$, wherein Et and At are earliest entry time and reserved entry time for entering the intersection, respectively, Td is traversing distance in the intersection with CAV length included, Rs and Ts are reserved speed and target speed within the intersection, respectively.

13. The IMS according to claim 1, wherein the space-time allocation algorithm is a BPF algorithm including a first phase to construct a set of the one or more traversing requests, a second phase to determine a processing sequence for the one or more traversing requests, and a third phase to calculate the solution space.

14. A method comprising:
receiving, by an intersection management system (IMS), one or more traversing requests from one or more Connected Autonomous Vehicles (CAVs) within a request zone of an intersection, wherein each of the one or more traversing requests corresponds to a respective CAV of the one or more CAVs;
determining, by the IMS, a Best Parallelepiped Fit (BPF) solution space comprising one or more CAV trajectories of each respective CAV for each of the one or more traversing requests in a space-time resource model of the intersection, wherein each of the one or more CAV trajectories of each respective CAV is represented by a parallelepiped comprising a traversing time, a traversing speed, and a CAV size;
finding, by the IMS, a CAV trajectory allocation in the space-time resource model for each of the one or more traversing requests based on the solution space of each respective CAV and each solution space of each of the other respective CAVs;
when one or more CAV trajectory allocations have been found, sending, by the IMS, an approved reservation to each CAV corresponding to each of the one or more CAV trajectory allocations that have been found such that each CAV is instructed to move through the intersection as specified in the approved reservation.

15. The method of claim 14, wherein the method further comprising, prior to the determination of the solution space for each of the one or more traversing requests:
allocating a sliding time window for when a first CAV, of the one or more CAVs, is allowed to enter the intersection for each of the one or more traversing requests, wherein the sliding time window comprises a time frame from an earliest entry time to the intersection to a sum of the earliest entry time and a time buffer, wherein the earliest entry time is calculated based on a current speed and a current position of the first CAV and the time buffer is calculated based on a traversing request failure count of the traversing request of the one or more traversing requests corresponding to the first CAV, and wherein
determining the solution space for each of the one or more traversing requests is based on the sliding time window for the first CAV and one or more different traversing speeds over one or more different entry times.

16. The method of claim 14, wherein the method further comprising, prior to the determination of the solution space for each of the one or more traversing requests:
determining a processing sequence for the one or more traversing requests based on a traversing request failure count of each of the one or more traversing requests, and wherein the determination of the solution space for each of the one or more traversing requests is processed based on the determined processing sequence for the one or more traversing requests.

17. The method of claim 14, wherein the method further comprising, when one or more CAV trajectory allocations failed, sending a rejected traversing request to each CAV corresponding to each of the one or more CAV trajectory allocations that failed.

18. The method of claim 14, wherein the method further comprising, for each of the one or more CAVs, when a rejected traversing request corresponding to the CAV is received from the IMS:
incrementing, by the CAV, a request failure count associated with the CAV; and
sending, by the CAV, a traversing request to the IMS until one of an approved reservation is received corresponding to the traversing request and the CAV enters an adjustment zone of the intersection.

19. The method of claim 14, wherein the method further comprising, for each of the one or more CAVs, when the CAV is in an adjustment zone of the intersection, adjust, by the CAV, speed, arrival time, and entry point based on the approved reservation.

20. The method of claim 14, wherein the method further comprising, for each of the one or more CAVs, when the approved reservation corresponding to the CAV is received from the IMS, stop sending any additional traversing requests to the IMS.

21. The method of claim 14, wherein the method further comprising, for each of the one or more CAVs, when a connection request is received from the IMS:
setting, by the CAV, a request failure count to zero;
determining, by the CAV an earliest arrival time to the intersection; and
sending, by the CAV, a traversing request to the IMS comprising the earliest arrival time to the intersection, a current vehicle speed, a position, an entry lane, a departure lane, the request failure count, and vehicle properties.

22. The method of claim 14, wherein a traversing request comprises an earliest arrival time to the intersection, a current vehicle speed, a position, an entry lane, a departure lane, a request failure count, and vehicle properties, wherein the vehicle properties comprise a vehicle identity number, a width, a length, a maximum speed, a maximum acceleration, and a maximum deceleration.

23. The method of claim 14, wherein the approved reservation comprises a reserved trajectory including an entry time that a CAV enters the intersection, a traversing time of the CAV through the intersection, and a traversing speed of the CAV inside the intersection.

* * * * *